United States Patent
Leum

(10) Patent No.: US 9,260,258 B1
(45) Date of Patent: Feb. 16, 2016

(54) REMOVABLE DOCK BARRIER

(71) Applicant: Grant Leum, Excelsior, MN (US)

(72) Inventor: Grant Leum, Excelsior, MN (US)

( * ) Notice: Subject to any disclaimer, the term of this patent is extended or adjusted under 35 U.S.C. 154(b) by 0 days.

(21) Appl. No.: 14/609,133

(22) Filed: Jan. 29, 2015

(51) Int. Cl.
| | |
|---|---|
| *E04D 13/18* | (2014.01) |
| *E04H 14/00* | (2006.01) |
| *B65G 69/28* | (2006.01) |
| *E01F 13/02* | (2006.01) |
| *E04G 27/00* | (2006.01) |
| *E04H 17/18* | (2006.01) |
| *E06B 11/00* | (2006.01) |
| *B65G 69/00* | (2006.01) |
| *E01F 13/04* | (2006.01) |

(52) U.S. Cl.
CPC .......... *B65G 69/2876* (2013.01); *E01F 13/024* (2013.01); *E04G 27/00* (2013.01); *E04H 17/18* (2013.01); *E06B 11/00* (2013.01); *B65G 69/008* (2013.01); *B65G 69/2888* (2013.01); *E01F 13/044* (2013.01)

(58) Field of Classification Search
CPC .. B65G 69/008; B65G 69/2888; E01F 13/044
USPC ........... 52/173.1, 173.2, 2.25, 202; 49/33, 36, 49/38, 50, 360; 14/69.5; 404/6
See application file for complete search history.

(56) References Cited

U.S. PATENT DOCUMENTS

| | | | |
|---|---|---|---|
| 3,548,433 A | 12/1970 | Miles et al. | |
| 3,802,018 A | 4/1974 | Miles et al. | |
| 3,877,681 A * | 4/1975 | Humphrey | E01F 15/006 256/1 |
| 4,624,446 A | 11/1986 | Gould | |
| 4,765,792 A | 8/1988 | Cherry et al. | |
| 5,311,628 A | 5/1994 | Springer et al. | |
| 5,564,238 A * | 10/1996 | Ellis | B65G 69/2876 49/447 |
| 5,845,356 A | 12/1998 | Kielinski | |
| 6,021,613 A * | 2/2000 | Reuter | A47B 21/06 52/238.1 |
| 6,547,223 B1 * | 4/2003 | Letourneau | E04G 21/3219 236/32 |
| 6,931,686 B2 | 8/2005 | Hoofard et al. | |
| 7,013,519 B2 | 3/2006 | Gleason | |
| 7,062,813 B2 | 6/2006 | Hoofard et al. | |
| 7,216,392 B2 | 5/2007 | Hoofard et al. | |
| 9,010,228 B2 * | 4/2015 | White | F41H 5/013 248/229.12 |
| 2002/0162994 A1 * | 11/2002 | Langlie | A01K 3/00 256/45 |
| 2003/0132427 A1 * | 7/2003 | Allenbaugh | E04G 21/3233 256/65.14 |
| 2004/0250360 A1 | 12/2004 | Young et al. | |
| 2010/0264390 A1 * | 10/2010 | Cerda | E02D 17/08 256/24 |
| 2011/0167996 A1 * | 7/2011 | White | F41H 5/013 89/36.01 |

(Continued)

OTHER PUBLICATIONS

Amitengineering. Movable Dock Ramp. YouTube, published on Nov. 2, 2012; Retrieved form the Internet on May 9, 2014, URL: http://www.youtube.com/watch?v=NPPd90-8a1g.

(Continued)

*Primary Examiner* — Chi Q Nguyen

(74) *Attorney, Agent, or Firm* — Jansson Munger McKinley & Kirby Ltd.

(57) ABSTRACT

A barrier for a dock with a dock upper surface terminating in a dock edge and a pair of vertical floor sleeves within the dock having openings at the dock upper surface. The barrier including an elongate base member having an H-beam structure with a horizontal web between two flanges, the base member defining a pair of forklift fork pockets, a pair of sleeve-insertion members extending downwardly from the base member and configured for engagement with the floor sleeves, at least one post member extending upwardly from the base member and a cross-member attached to the at least one post member and spaced above the base member.

20 Claims, 10 Drawing Sheets

(56) References Cited

U.S. PATENT DOCUMENTS

2012/0207542 A1* 8/2012 Amengual Pericas ...... E01F 15/143
  404/6
2013/0236246 A1* 9/2013 Whiteley .............. E01F 13/022
  404/6

OTHER PUBLICATIONS

Leumengineering. Mobile Loading Dock—How It Works. YouTube, published on Jun. 14, 2013; Retrieved from the Internet on May 9, 2014, URL: https://www.youtube.com/watch?v=kyvwWLhSQqo.

* cited by examiner

REMOVABLE DOCK BARRIER

FIELD

This device relates to dock barriers and more particularly to a dock barrier that is able to be easily installed and removed.

BACKGROUND

A variety of loading dock and rail dock barriers have been devised to protect both vehicles and individuals from falling off a dock edge or through doorways. Such areas can be hazardous since dock edges usually have a drop of several feet to the floor below.

Dock barriers of the prior art typically have certain disadvantages. One such disadvantage is that barrier material is not strong enough to stop and withstand an impact from a forklift. Fabric-type barriers which are retractable save space but are oftentimes flimsy and unable to completely stop a forklift that is traveling several miles per hour and also carrying product. Many of the barrier devices of the prior art consist of retractable barriers that are placed in front of loading dock doors or other doorways. One such device is seen in U.S. Pat. No. 8,490,668 which discloses a retractable fabric-like barrier with a roll-up mechanism that is placed in front of a loading dock platform to prevent people or equipment, such as a fork lift, from accidentally driving off of a loading dock edge.

Permanent guard rails are also used in various industries to prevent fork lifts or other material handling equipment from impacting machinery and causing damage. A disadvantage to barriers of this type are that permanent guard rails can be costly to install and are also unable to be removed once they are installed. This can be inconvenient and can take up valuable warehouse or dock space.

Another disadvantage of barriers of the prior art are that oftentimes they take one or more individuals to install and maneuver a barrier into an open or closed position. This typically requires a forklift driver to leave the forklift to open or close the barrier and then get back into the forklift to load or unload the material being transported. It can be very cumbersome for a driver to get in and out of a forklift and manually open and close a barrier or install and remove a barrier. This is a very time consuming process which may even take more than one individual to execute.

Barriers of the prior art can also be cumbersome to install or attach to the dock surface. It would be desirable to have a barrier which is easily installed and connected to the dock surface.

There is a need for a barrier which is strong enough to withstand the impact from a forklift carrying a load and able to be easily installed or removed so a forklift driver doesn't have to leave the forklift and also easy to store so as to save valuable warehouse/dock space and user time.

This device overcomes certain problems and shortcomings in the prior art, including those mentioned above and others, and provides advantages for an removable dock barrier not previously provided.

SUMMARY

This device is an improvement in a barrier for a dock with a dock upper surface terminating in a dock edge and a pair of vertical floor sleeves within the dock having openings at the dock upper surface of the type having an elongate base member including an H-beam structure with a horizontal web between two flanges, the base member defining a pair of forklift fork pockets, a pair of sleeve-insertion members extending downwardly from the base member and configured for engagement with the floor sleeves, at least one post member extending upwardly from the base member and a cross-member attached to the at least one post member and spaced above the base member.

Preferably, the sleeve-insertion members are attached to the lower side of the H-beam structure. It is also preferable that the sleeve-insertion members are welded to the lower side of the H-beam structure. In highly preferred embodiments the sleeve-insertion members is a flat plate oriented transverse to the dock edge and having an upper portion welded on three edges to the flanges and web of the H-beam structure.

It is preferable that the cross-member is welded to the at least one post member and that the barrier include an elongate mid-member welded to the at least one post member between the cross-member and base member. Highly-preferred embodiments include two post members spaced from one another along the elongate base member and each of the post members is welded to the upper side of the base member. The post members is a flat plate having a lowermost end welded on two edges to one of the flanges and the web.

It is highly preferable that the flanges of the H-beam include a dock-edge-adjacent flange. Preferably, each post member includes a top hook configured to hook over the cross-member of a second barrier when the barrier and second barrier are in a stacked non-use position and a bottom hook configured to hook over the dock-edge-adjacent flange of the second barrier when the barrier and second barrier are in a stacked non-use position. Also preferable is that the post members are flat plates configured to include top and bottom hooks.

In highly-preferred embodiments, each vertical floor sleeve has an upper edge and a sleeve-orientation tab is removably attached to the upper edge, the tab being oriented to facilitate installation of the sleeve in the proper orientation. Preferably, the tab is a vertical planar strip extending across the upper edge of the sleeve. It is also highly-preferred that each vertical floor sleeve include at least one circular retaining-collar thereabout with at least one vertical opening there through to facilitate installation.

The preferred inventive method for installing a plurality of vertical floor sleeves for barrier mounting in a dock that includes a dock upper surface terminating in a dock edge, the barrier having sleeve-insertion members for removable insertion in the floor sleeves comprises the following steps. Providing a vertical floor sleeve including an upper edge forming an opening for alignment with the dock upper surface and a sleeve-orientation tab removably attached to the upper edge, the tab being arranged to facilitate installation of the sleeve in the proper orientation; forming a hole in the dock, the hole being exposed at the dock upper surface and having a cross-section sufficient to receive the floor sleeve; inserting the floor sleeve into the hole so that the upper edge is at the opening of the hole; rotationally orienting the floor sleeve with respect to the dock edge using the sleeve-orientation tab so that the floor sleeve is properly oriented with respect to the dock edge for removably receiving the sleeve-insertion member of the barrier; filling the hole with grout, concrete or asphalt around the floor sleeve and detaching the sleeve-orientation tab from the upper edge of the floor sleeve.

In highly-preferred embodiments, the forming step is drilling a cylindrical hole in the dock and the filling step is facilitated by going through the collars.

The term "H-beam" as used herein refers to an I-beam having flanges the width of the web. The web being located between each flange.

BRIEF DESCRIPTION OF THE DRAWINGS

The drawings illustrate a preferred embodiment including the above-noted characteristics and features of the device. The device will be readily understood from the descriptions and drawings. In the drawings.

DETAILED DESCRIPTION OF PREFERRED EMBODIMENTS

Figure 1:
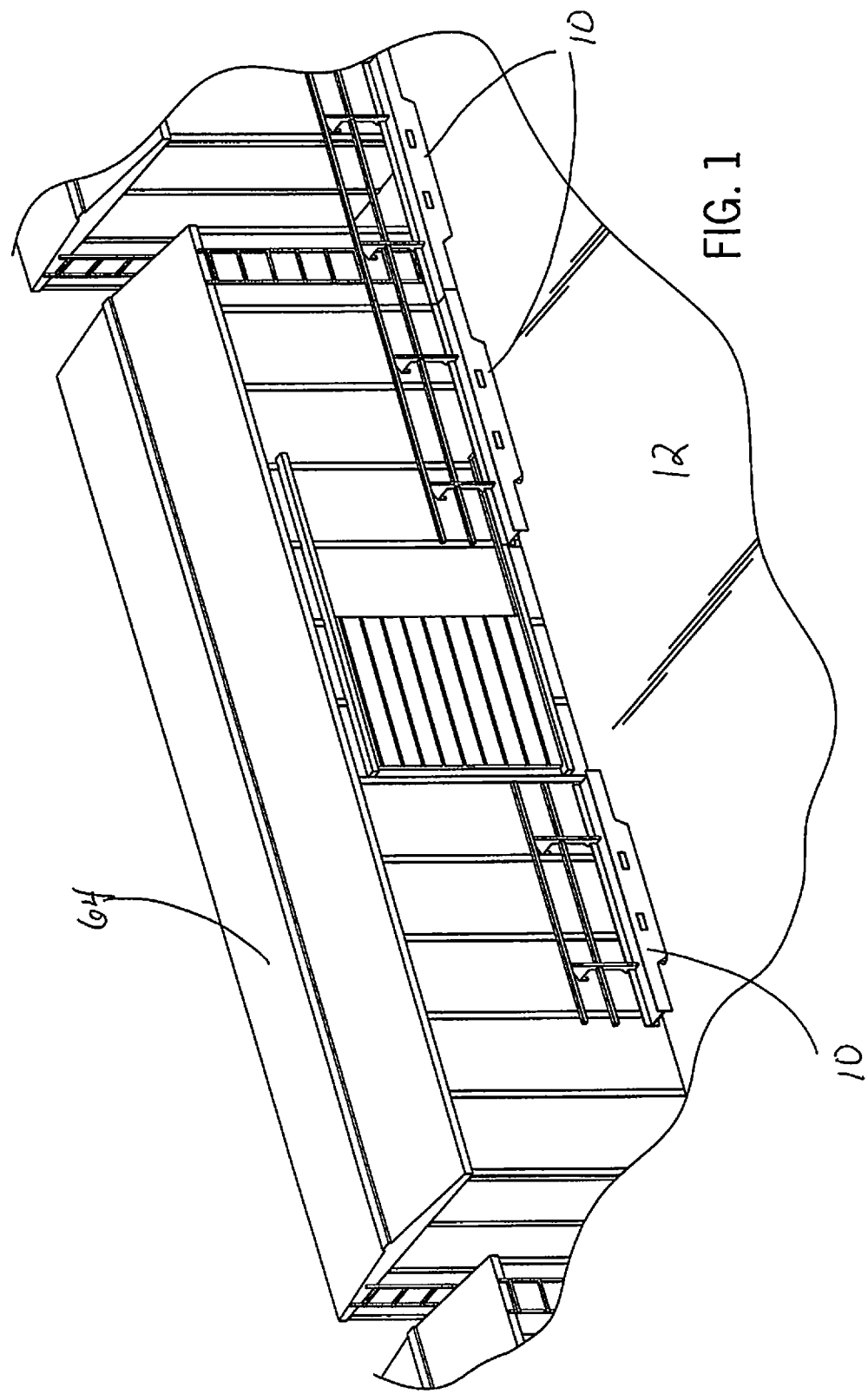
FIG. 1 is a perspective view of several removable barriers for a dock.

FIGS. 1-14 illustrate a barrier 10 for a dock 12 with a dock upper surface 14 terminating in a dock edge 16 and a pair of vertical floor sleeves 18 within the dock 12 having openings 20 at dock upper surface 14 of the type having an elongate base member 22 including an H-beam structure 24 with a horizontal web 26 between two flanges 28. Base member 22 defines a pair of forklift fork pockets 30. A pair of sleeve-insertion members 32 extending downwardly from base member 22 and configured for engagement with floor sleeves 18. At least one post member 34 extends upwardly from base member 22 and a cross-member 36 is attached to post member 34 and spaced above base member 22.

FIG. 1 illustrates that barrier 10 can be used on a rail dock 12 with trains 64 or a loading dock of any type. Barrier 10 can also be installed for security purposes in various setting.

Figure 2:
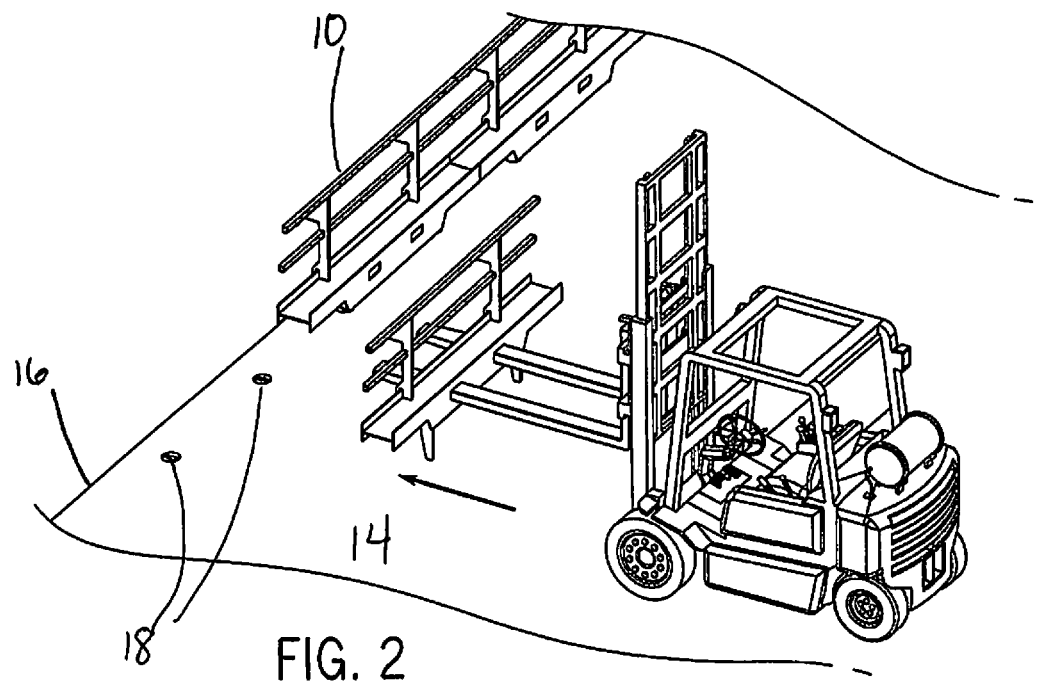
FIG. 2 is a perspective view of the barrier of FIG. 1 being inserted into the dock.
Figure 3:
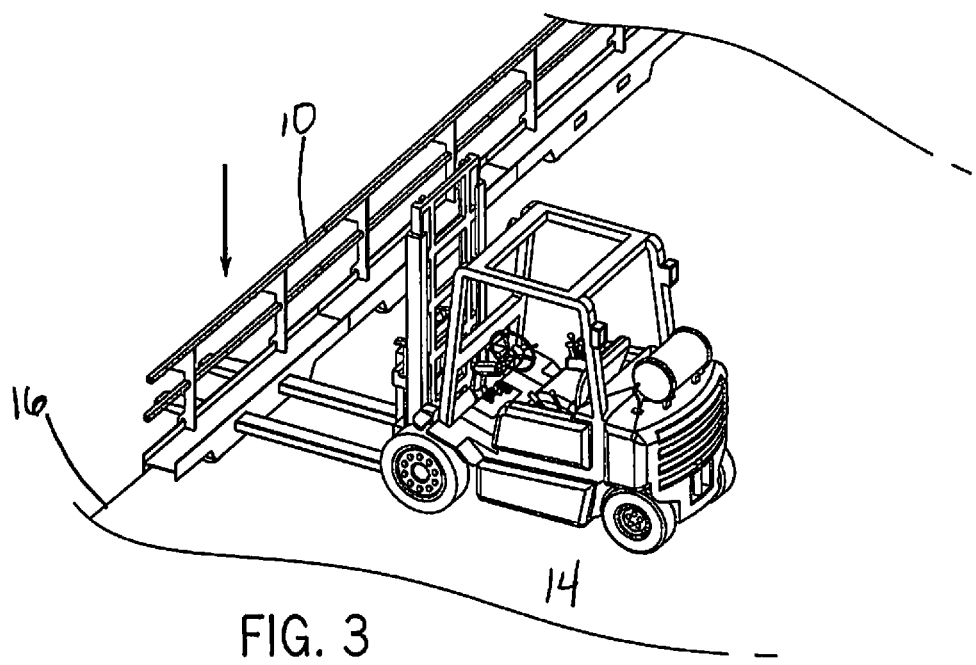
FIG. 3 is a perspective view of the barrier of FIG. 1 being inserted into the dock.

FIGS. 2-3 illustrate that barrier 10 is inserted into vertical sleeves 18 in dock upper surface 14. Barrier 10 has fork lift pockets 30 which allow a forklift or other material handling device with forks to easily move, install and uninstall barrier 10 from vertical sleeves 18 in dock upper surface 14. The fork lift operator does not have to leave the forklift to accomplish this. As can also be seen in FIGS. 2-3, multiple barriers 10 can be installed in a row at dock edge 16.

Figure 4:
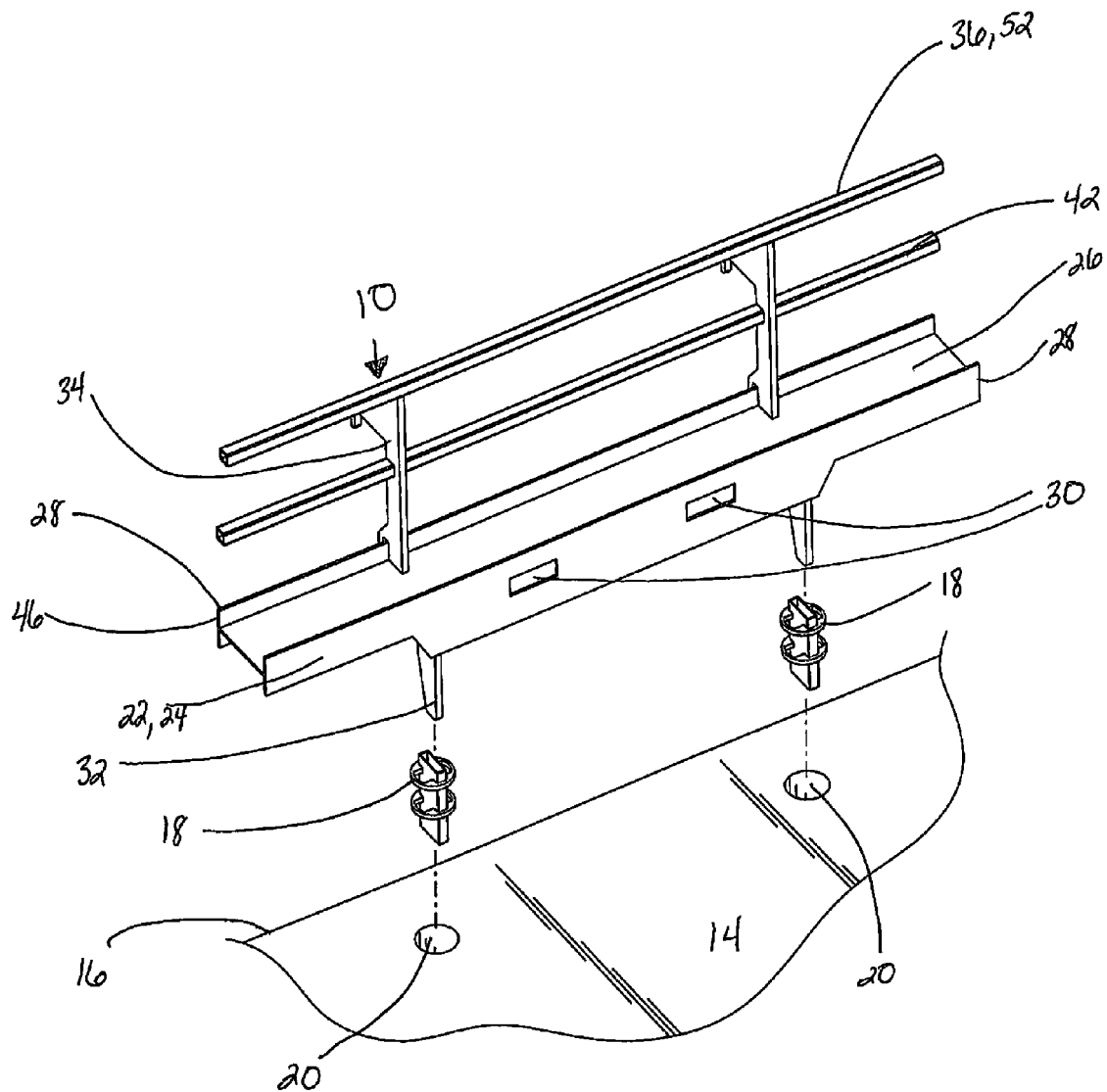
FIG. 4 is an exploded view of the barrier of FIG. 1 and vertical floor sleeves.

As seen in FIG. 4, sleeve-insertion members 32 are attached to lower side 38 of H-beam structure 24. Sleeve-insertion members 32 are welded to lower side 38 of H-beam structure 24. FIG. 4 illustrates that barrier 10 is an H-beam structure 24 consisting of a web 26 and two flanges 28. One of the two flanges 28 is a dock-edge adjacent flange 46 which is the flange 28 closest to the dock edge 16 when installed in floor sleeve 18. As seen in FIG. 4, the pair of sleeve-insertion members 32 on each barrier 10 fit into a corresponding pair of floor sleeves 18 which engage floor sleeve openings 20 in dock 12.

Figure 5:
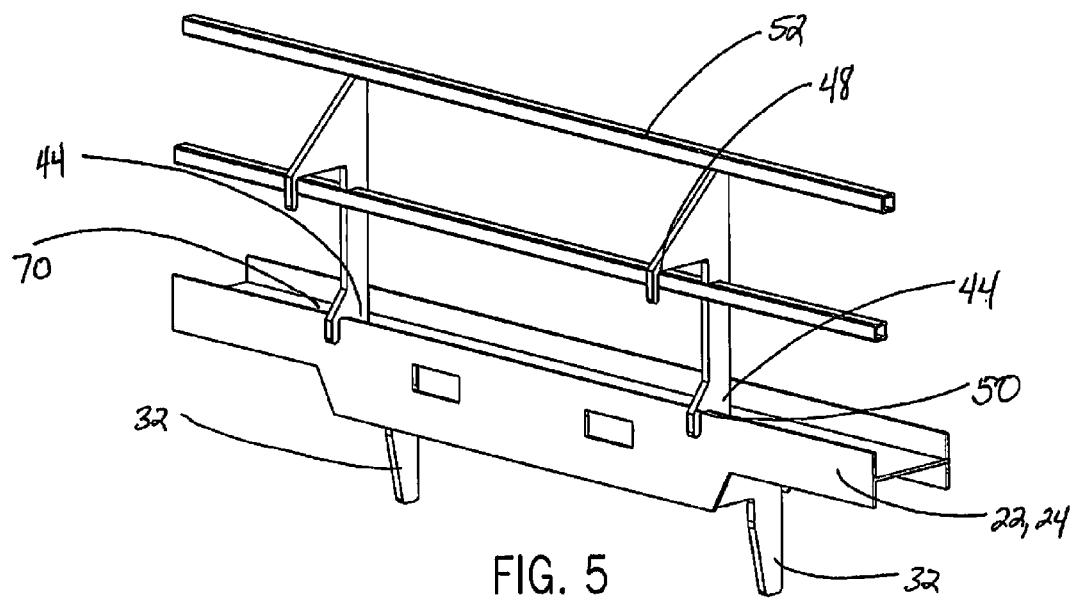
FIG. 5 is a front perspective view of the barrier of FIG. 1.

FIG. 5 illustrates in more detail barrier 10 including that barrier 10 has a cross-member 36 (also referred to as a top rail 52) and two post members 34 as well as a mid-member 42 in some embodiments. Post members 34 each have a top hook 48 and a bottom hook 50. As seen best in FIG. 5, cross-member 36 is welded to at least one post member 34 and barrier 10 includes an elongate mid-member 42 welded at least one post member 34 between cross-member 36 and base member 22. Post members 34 are spaced from one another along elongate base member 22 and each post member 34 is welded to upper side 70 of base member 22. Post members 34 are flat plates having a lowermost end 44 welded on two edges to one of the flanges 28 and web 26.

Figure 6:
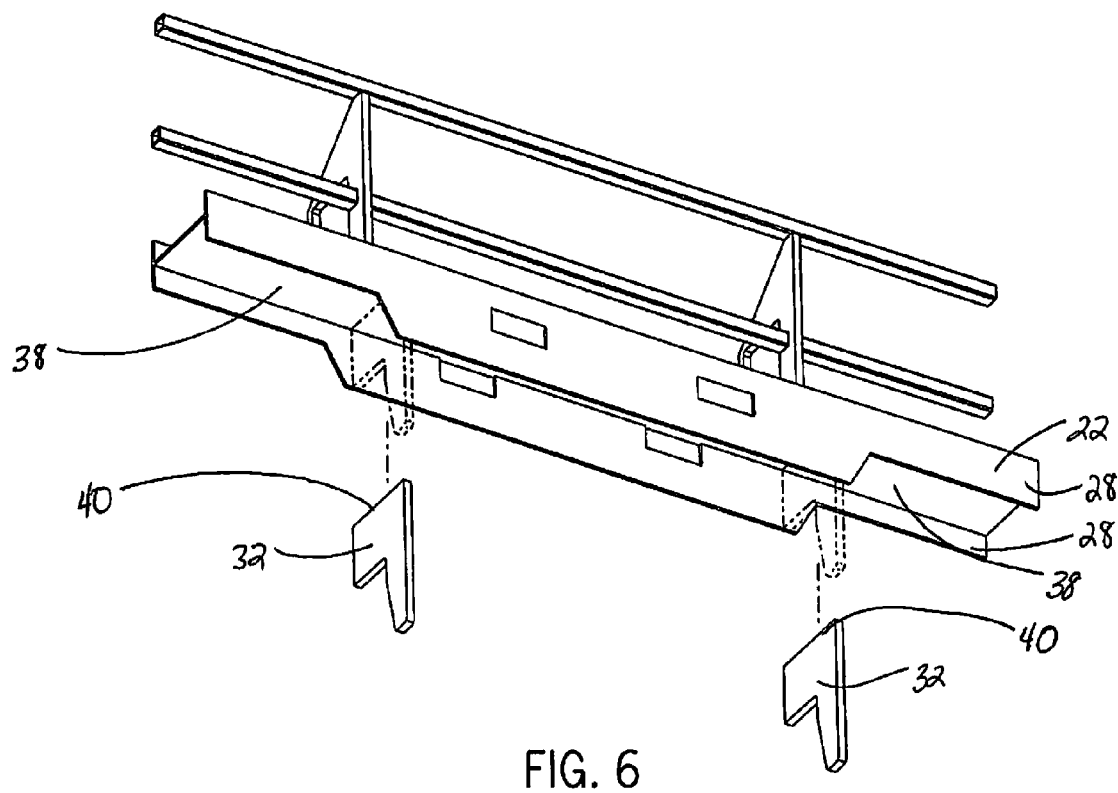
FIG. 6 is a partial exploded view of the barrier showing the pair of sleeve-insertion members.
Figure 7:
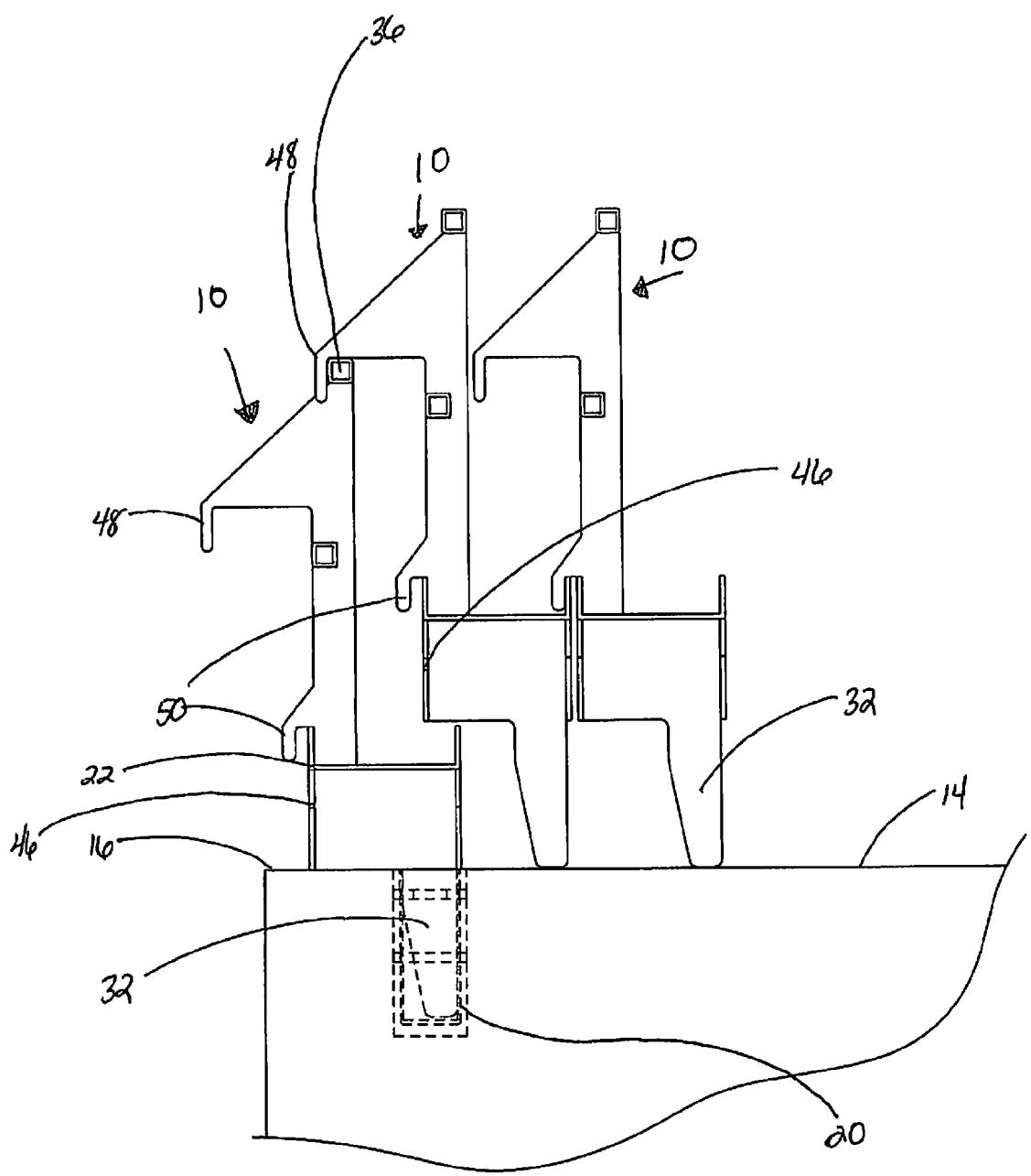
FIG. 7 is a partial cutaway showing a sleeve-insertion member engaged with a floor sleeve.

As seen best in FIGS. 6-7, sleeve-insertion member 32 is a flat plate oriented transverse to dock edge 16 and having an upper portion 40 welded on three edges to flanges 28 and web 26 of the lower side 38 of H-beam structure 24.

FIG. 7 illustrates in more detail that top hook 48 is configured to hook over cross-member 36 of a second barrier 10 when a first barrier 10 and a second barrier 10 are in a stacked non-use position as seen in FIG. 7. Bottom hook 50 is configured to hook over dock-edge-adjacent flange 46 of a second barrier 10 when a first barrier 10 and a second barrier 10 are in a stacked non-use position as seen in FIG. 7. Such orientation saves space when storing barriers 10 and also provides a secure storage method for barriers 10.

Figure 8:
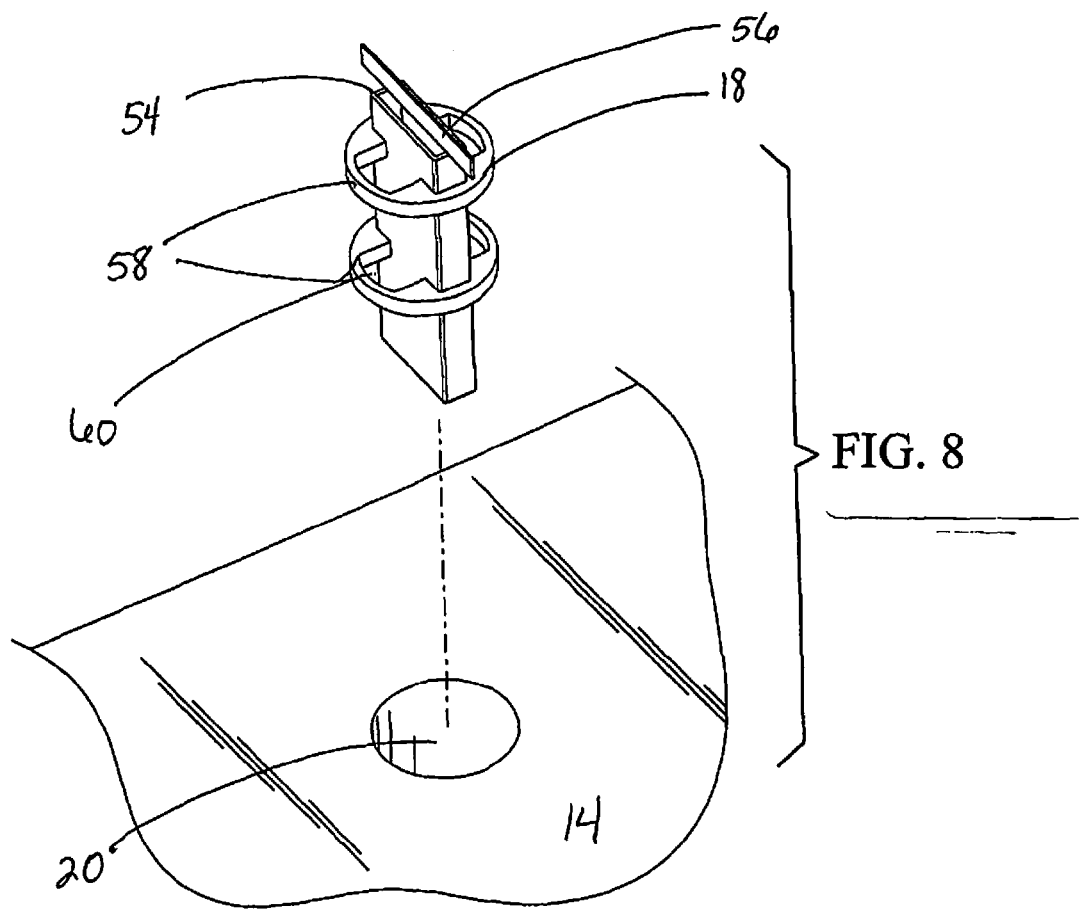
FIG. 8 is a perspective view of the sleeve-insertion member prior to insertion into a floor sleeve.
Figure 9:
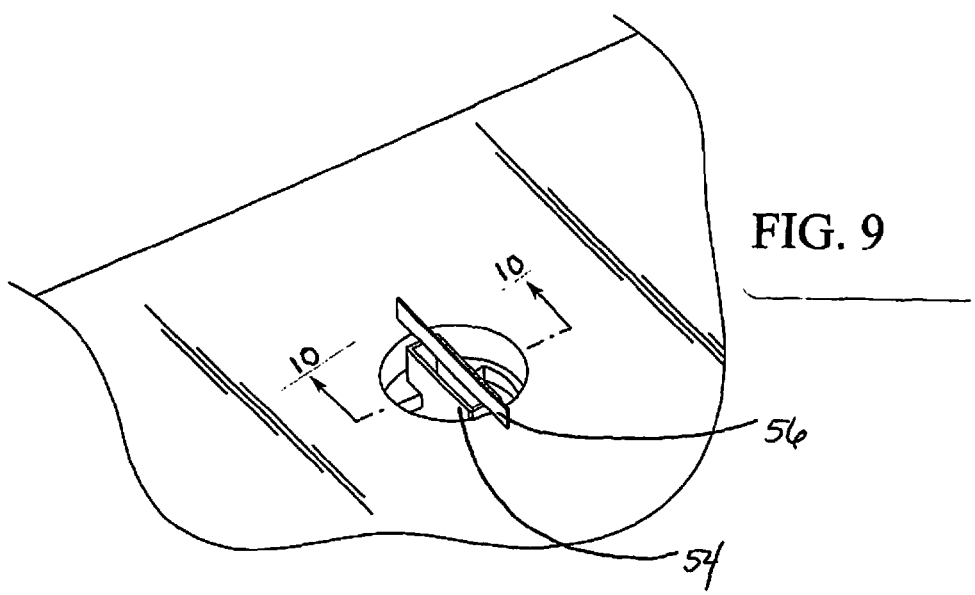
FIG. 9 is a perspective view of the sleeve-insertion member inserted into the floor sleeve.

FIGS. 8-14 illustrate detail of vertical floor sleeve 18 and its engagement with dock upper surface 14 and sleeve-insertion members 32. As seen best in FIG. 8, vertical floor sleeve 18 has upper edge 54 and sleeve-orientation tab 56 is removably attached to upper edge 54. Tab 56 is oriented to facilitate installation of sleeve 18 in the proper orientation. FIGS. 8-13 illustrate that tab 56 is a vertical planar strip extending across upper edge 54 of sleeve 18. As seen in FIG. 8, sleeve 18 engages floor sleeve opening 20 in dock 12. FIG. 8 illustrates that each vertical floor sleeve 18 include at least one circular retaining-collar 58 with at least one vertical opening 60 to facilitate installation.

FIGS. 9-14 show sleeve 18 inserted into floor sleeve opening 20 and the method of installation of floor sleeve 18 into floor sleeve opening 20.

In the method of installation, vertical floor sleeve 18 has an upper edge 54 forming an opening 20 for alignment with dock upper surface 14. Sleeve-orientation tab 56 is removably attached to upper edge 54, tab 56 is arranged to facilitate installation of sleeve 18 in the proper orientation. To install sleeve, a hole 20 is formed in dock 12 by any operation such as drilling a cylindrical hole. Hole 20 is exposed at the dock upper surface 14 and has a cross-section sufficient to receive floor sleeve 18. Floor sleeve 18 is then inserted into hole 20 so that the upper edge 54 is at the opening of the hole 20. Next, floor sleeve 18 is rotationally oriented with respect to the dock edge 16 by using the sleeve-orientation tab 56 so that floor sleeve 18 is properly oriented with respect to the dock edge 16 for removably receiving sleeve-insertion member 32 of the barrier 10. Hole 20 containing floor sleeve 18 is then filled with grout, concrete, asphalt 62 or any other appropriate substance around floor sleeve 18. Grout, concrete or asphalt 62 flows through the openings 60 in collars 58. Finally, sleeve-orientation tab 56 is detached from upper edge 54 of floor sleeve 18.

Figure 10:
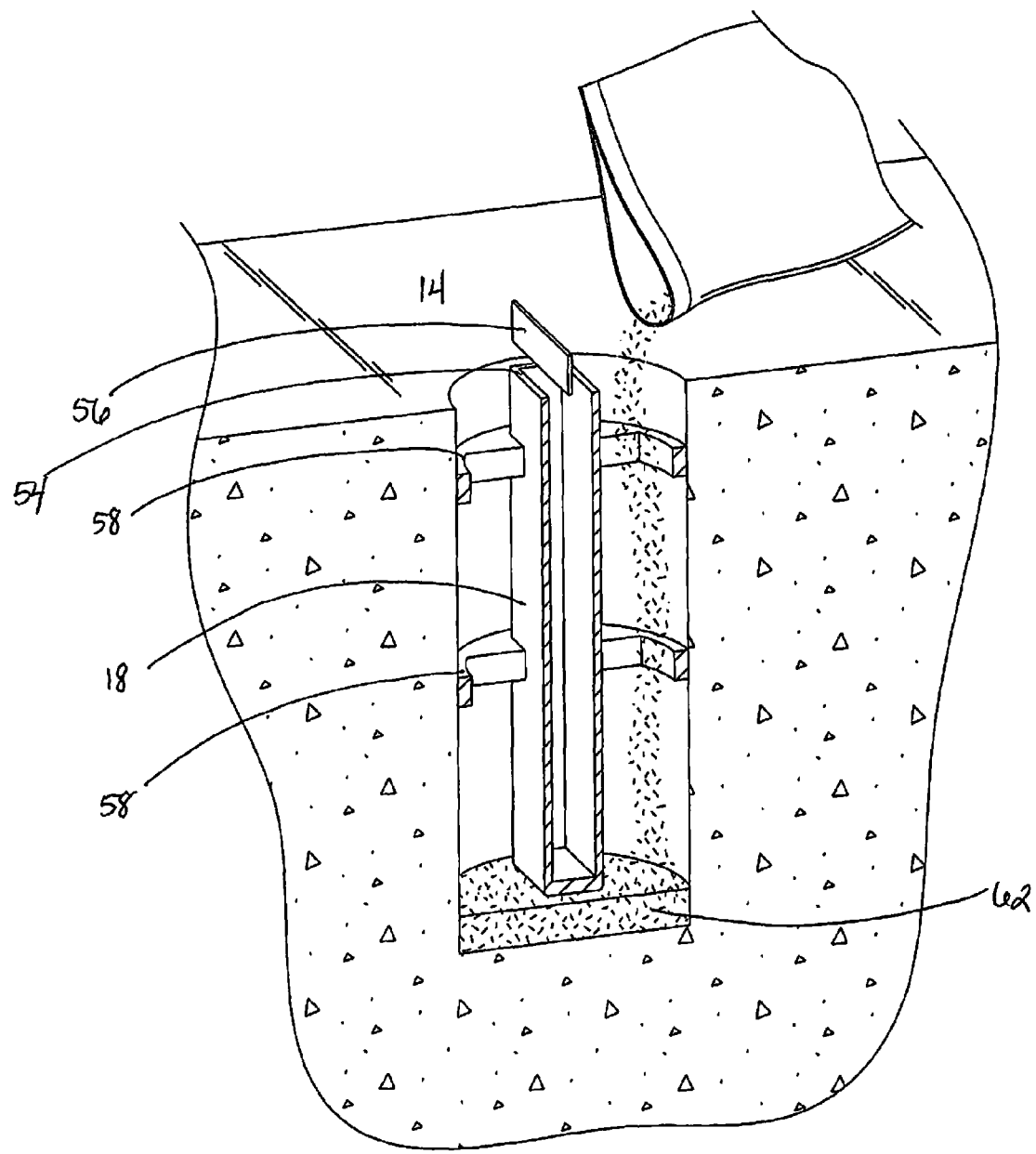
FIG. 10 is a cross-sectional view of the sleeve-insertion member inserted into a floor sleeve taken along line 10-10 of FIG. 9.
Figure 11:
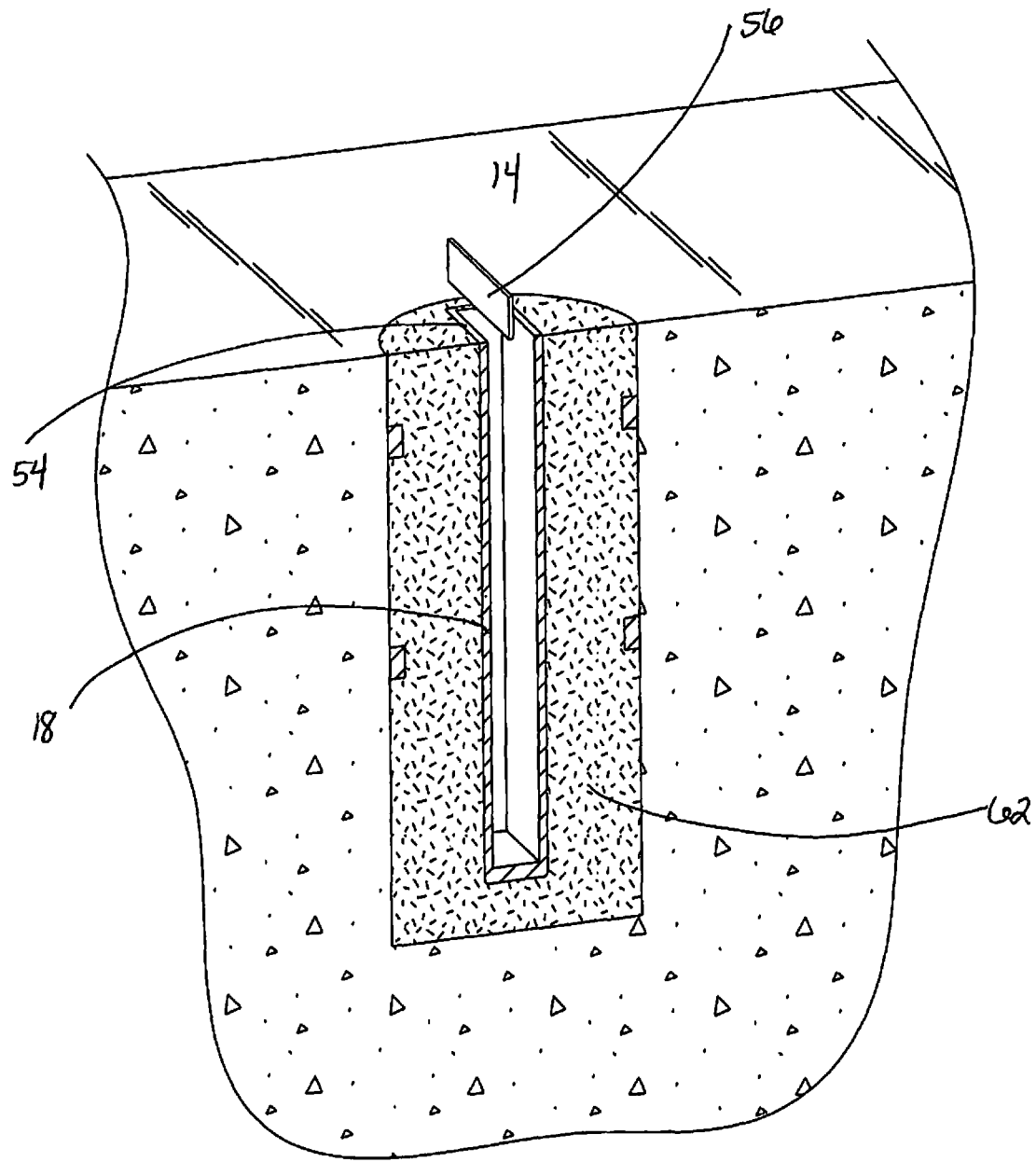
FIG. 11 is a cross-sectional view of the sleeve-insertion member inserted into a floor sleeve.
Figure 12:
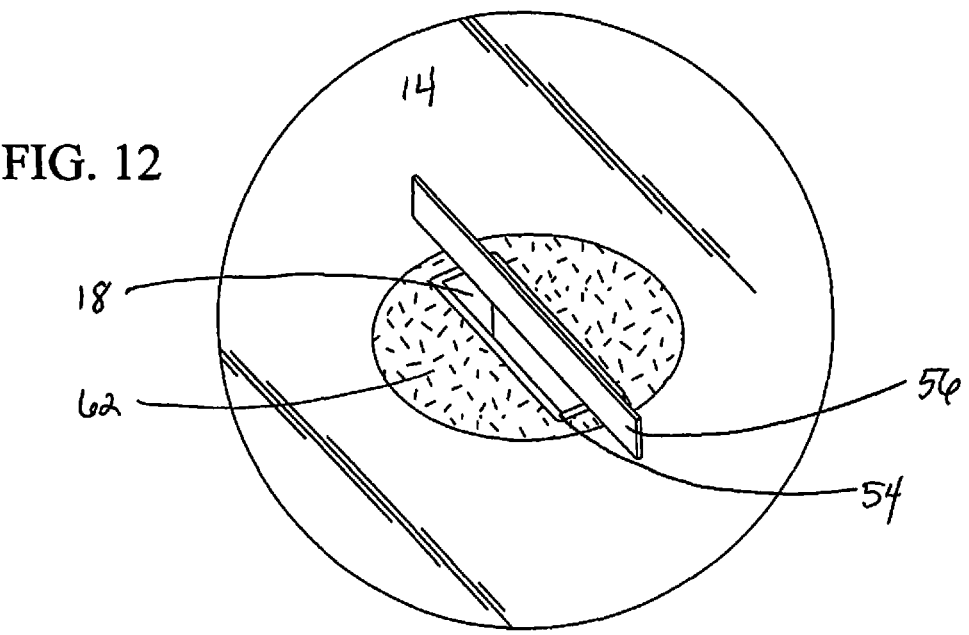
FIG. 12 is a perspective view of the sleeve-insertion member with a tab.
Figure 13:
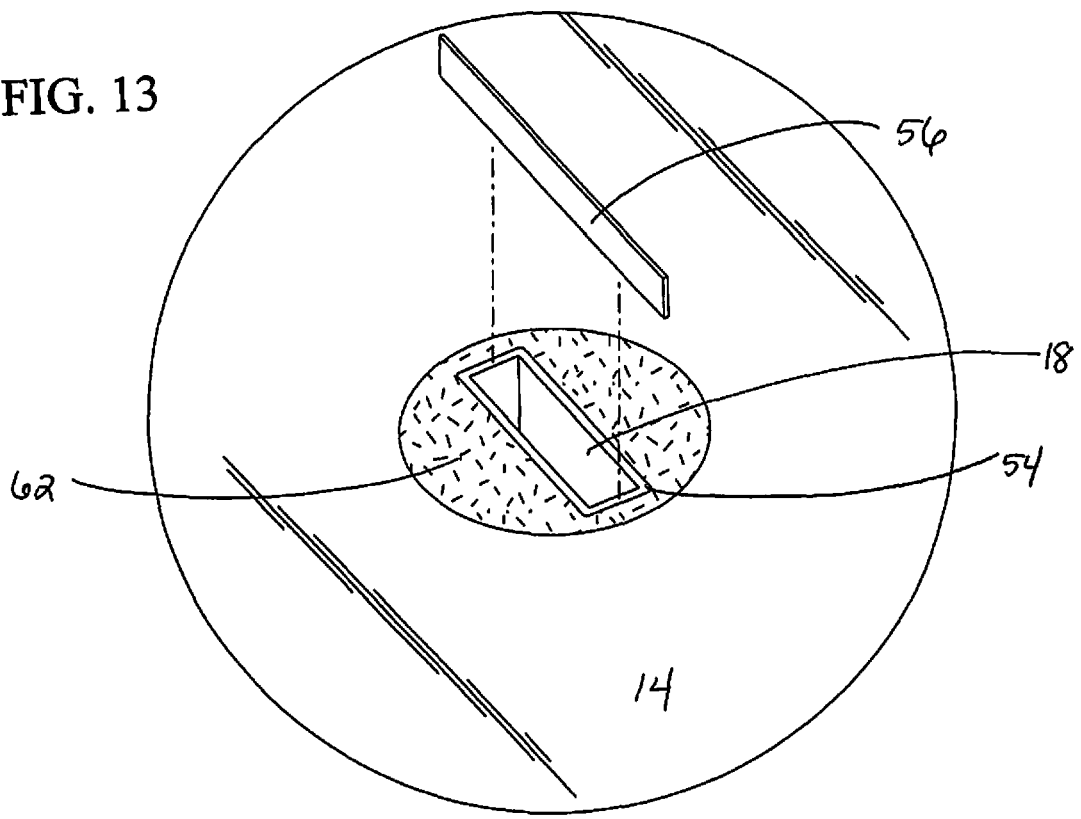
FIG. 13 is a perspective view of the sleeve-insertion member with the tab removed.
Figure 14:
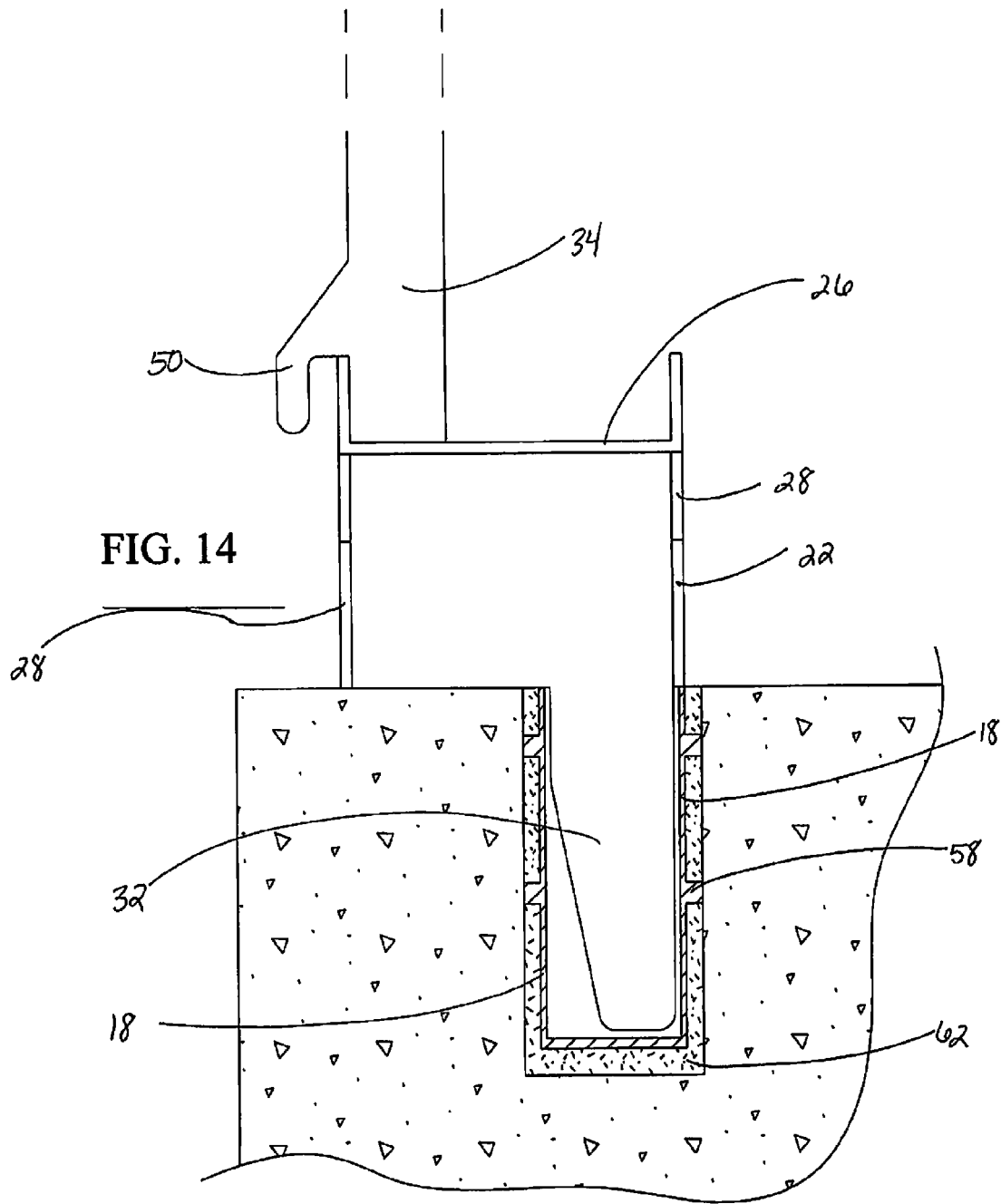
FIG. 14 is a cross-sectional view of the sleeve-insertion member inserted into a floor sleeve.

FIG. 10 illustrates the substance such as grout, concrete or asphalt filling hole 20. FIG. 11 shows hole 20 filled with grout, concrete or asphalt 62 and sleeve 18 fixed in place. FIG. 12 shows tab 56 in place and FIG. 13 illustrates tab 56 detached from sleeve 18. FIG. 14 illustrates sleeve-insertion member 32 engaged with floor sleeve 18 in floor sleeve opening 20 in dock 12.

A wide variety of materials are available for the various parts discussed and illustrated herein. Although the device has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A barrier for a dock with a dock upper surface terminating in a dock edge and a pair of vertical floor sleeves within the dock having openings at the dock upper surface, comprising:
   an elongate base member including an H-beam structure with a horizontal web between two flanges, the base member defining a pair of forklift fork pockets, the flanges of the H-beam including a dock-edge-adjacent flange and each post member including (a) a top hook configured to hook over the cross-member of a second barrier when the barrier and second barrier are in a stacked non-use position; and (b) a bottom hook configured to hook over the dock-edge-adjacent flange of the second barrier when the barrier and second barrier are in a stacked non-use position;
   a pair of sleeve-insertion members extending downwardly from the base member and configured for engagement with the floor sleeves;
   at least one post member extending upwardly from the base member; and
   a cross-member attached to the at least one post member and spaced above the base member.

2. The barrier of claim 1 wherein the sleeve-insertion members are attached to the lower side of the H-beam structure.

3. The barrier of claim 1 wherein the sleeve-insertion members are welded to the lower side of the H-beam structure.

4. The barrier of claim 3 wherein each of the sleeve-insertion members is a flat plate oriented transverse to the dock edge and having an upper portion welded on three edges to the flanges and web of the H-beam structure.

5. The barrier of claim 1 wherein the cross-member is welded to the at least one post member.

6. The barrier of claim 5 further including an elongate mid-member welded to the at least one post member between the cross-member and base member.

7. The barrier of claim 1 wherein there are two post members spaced from one another along the elongate base member and each of the post members is welded to the upper side of the base member.

8. The barrier of claim 7 wherein each of the post members is a flat plate having a lowermost end welded on two edges to one of the flanges and the web.

9. The barrier of claim 1 wherein each of the post members is a flat plate configured to include top and bottom hooks.

10. The barrier of claim 1 wherein the engagement is removable insertion.

11. In a barrier for a dock with a dock upper surface terminating in a dock edge and a pair of vertical floor sleeves within the dock having openings at the dock upper surface, said barrier including an elongate base member for extending along the dock and defining a pair of forklift fork pockets, a pair of sleeve-insertion members extending downwardly from the base member and configured for engagement with the floor sleeves, post members extending upwardly from the base member and a top rail attached to the post members, the improvement wherein the elongate base member includes an H-beam structure with a horizontal web between two flanges, the flanges of the H-beam include a dock-edge-adjacent flange and each post member includes (a) a top hook configured to hook over the cross-member of a second barrier when the barrier and second barrier are in a stacked non-use position; and (b) a bottom hook configured to hook over the dock-edge-adjacent flange of the second barrier when the barrier and second barrier are in a stacked non-use position.

12. The barrier of claim 11 wherein the sleeve-insertion members are attached to the lower side of the H-beam structure.

13. The barrier of claim 11 wherein the sleeve-insertion members are welded to the lower side of the H-beam structure.

14. The barrier of claim 13 wherein each of the sleeve-insertion members is a flat plate oriented transverse to the dock edge and having an upper portion welded on three edges to the flanges and web of the H-beam structure.

15. The barrier of claim 11 wherein the cross-member is welded to the at least one post member.

16. The barrier of claim 15 further including an elongate mid-member welded to the at least one post member between the cross-member and base member.

17. The barrier of claim 11 wherein there are two post members spaced from one another along the elongate base member and each of the post members is welded to the upper side of the base member.

18. The barrier of claim 17 wherein each of the post members is a flat plate having a lowermost end welded on two edges to one of the flanges and the web.

19. The barrier of claim 11 wherein each of the post members is a flat plate configured to include top and bottom hooks.

20. The barrier of claim 11 wherein the engagement is removable insertion.

* * * * *